United States Patent
Bentley

[11] Patent Number: 5,980,364
[45] Date of Patent: Nov. 9, 1999

[54] METHOD AND APPARATUS FOR CUTTING RINGS FROM FORGING STOCK

[76] Inventor: Richard Bentley, 1315 Robert Ct., Brea, Calif. 92821

[21] Appl. No.: 09/119,759

[22] Filed: Jul. 21, 1998

[51] Int. Cl.$^6$ ........................................................ B24B 1/00
[52] U.S. Cl. ................................ 451/51; 451/49; 451/53; 451/178; 451/236
[58] Field of Search ................................ 451/49, 51, 53, 451/178, 236

[56] References Cited

U.S. PATENT DOCUMENTS

| | | | |
|---|---|---|---|
| 3,756,102 | 9/1973 | Casey | 82/40 |
| 4,052,822 | 10/1977 | Obear | 451/24 |
| 5,846,121 | 12/1998 | Hayashi et al. | 451/8 |

*Primary Examiner*—David A. Scherbel
*Assistant Examiner*—Shantese McDonald
*Attorney, Agent, or Firm*—Beehler & Pavitt; David A. Belasco; William H. Pavitt

[57] ABSTRACT

A method and apparatus for cutting rings from forging stock is described. The invention includes a rigid machine base affixed to a horizontal mounting surface. A rotating headstock, capable of at least one speed is permanently mounted to the machine base. A four-jaw chuck is removably attached to the front face of the rotating headstock for mounting forging stock of irregular cross-section. A three-jaw chuck is removably mounted in the four-jaw chuck for holding forging stocks of regular cross-section. An abrasive cut-off wheel is removably mounted to a rotating saw arbor. The saw arbor is pivotally mounted parallel to the axis of rotation of the headstock. The pivotal mounting for the saw arbor is slidably mounted to the machine base so that the distance form the cut-off wheel to the front face of the headstock may be varied by the operator to cut rings of varying thickness. A digital readout and incremental adjustment means are provided to control the movement of the saw arbor along the length of the forging stock. Both automatic and manual means are provided to cause the cut-off wheel to pivot toward the rotating forging stock clamped in the chuck. Means are provided to control the surface cutting speed of the cut-off wheel as it decreases in size from wear. Means are also provided to cool the cut-off wheel and forging stock as the forging stock is cut into rings, as are means to remove particulate matter from the exhaust stream from the cut-off wheel. When the operator desires to cut forging stock of regular cross-section, the three-jaw chuck and automatic saw feed are employed. When the operator desires to cut forging stock of irregular cross-section, the independently adjustable four-jaw chuck and manual saw feed are employed.

12 Claims, 5 Drawing Sheets

METHOD AND APPARATUS FOR CUTTING RINGS FROM FORGING STOCK

FIELD OF INVENTION

The invention pertains to metal cutting and grinding machines. More particularly, the invention relates to machines that employ abrasive cut-off wheels to divide metal forgings into precision measured ring sections for further processing.

BACKGROUND OF THE INVENTION

High-grade nickel-steel alloys and related materials are typically used for the manufacture of aircraft engine parts and other high-stress, high-temperature applications. These materials are necessarily difficult to cut or machine and tend to be expensive so it is desirable that waste should be minimized. Cutting of these high-strength alloys usually requires the use of abrasive cut-off wheels that are consumed in the cutting process, posing a potential air pollution hazard for the machine operator and those nearby. It is often desirable to divide a piece of forging stock of such material into nearly identical size ring sections for further forging or machining. If the ring sections can be identically sized and a minimum of material lost in the cutting, the process will be more economical.

Various types of machines have been developed for precision cutting of rings. Examples include: U.S. Pat. No. 4,052,822 issued to Obear is directed to a cut-off machine that employs a pair of abrasive cut-off wheels, the first of a larger diameter, and the second being a used, worn-down wheel of a smaller diameter. The second, smaller wheel, which is necessarily more rigid than a larger wheel, is used to produce an accurate scoring cut to align the larger cut-off wheel.

U.S. Pat. No. 3,877,180 issued to Brecker, is directed to a hydraulic, feedback-controlled system for directing an abrasive cut-off wheel. A first hydraulic system supplies torque to the cut-off wheel, while a second hydraulic system urges the cut-off wheel toward the workpiece. A feedback system balances the pressure applied to urge the cut-off wheel toward the workpiece with the system supplying torque to the wheel so that a constant rotational cutting speed may be maintained.

U.S. Pat. No. 4,802,311, issued to Schreder et al. is directed to a method of grinding rotary workpieces that is automatic and has accurate calibration of work monitoring. The method employs a surface grinding apparatus that is moved horizontally and vertically about a rotating workpiece.

U.S. Pat. No. 5,595,525 issued to Hayashi et al. is directed to a numerically controlled grinding machine. In this invention one grinding wheel grinds a workpiece having a plurality of portions to be ground with the machine enabling an operator to easily and correctly input grinding data and to modify the data in response to grinding conditions displayed to the operator.

U.S. Pat. No. Re. 33,904 issued to Rudy et al. is directed to a method and apparatus for automatically cutting food products to predetermined weight or shape. As the food products move along a conveyor, a camera provides a programmed computer with dimensional data and thus the computer is able to control the operation of the cutters in order to cut the material into portions of equal weight.

Finally, U.S. Pat. No. 4,831,907 issued to Gnann describes is directed to a method and apparatus for checking performance of a cut-off operation on automatic lathes for working bar material or the like.

While other inventions exist having features desirable for efficient cutting of rings from forging stocks the above-described designs for cut-off machinery and related features are typical of those encountered in the prior art.

It is an objective of the present invention to provide for cutting of rings of precisely described dimensions from forging stocks of high-strength alloys. It is a further objective to provide such precision cutting with a minimum of waste. It is yet a further objective to permit the safe and economical cutting of rings from both cylindrical forging stock and forging stock of irregular cross-section. It is yet another objective of the invention to provide a means for efficiently recycling the waste material produced by the cutting process while minimizing any pollution produced by the process. It is still another objective to provide a means to maintain a constant surface speed of the cutting means with respect to the forging stock despite wear of the cutting means. It is a still further objective of the invention to control the temperature of the cutting process to maximize cutting speed while minimizing heat distortion and wear of the cutting means. Finally, it is an objective of the invention to provide the above-described capabilities in an inexpensive and durable machine, which is capable of extended duty cycles, and that may be easily repaired and maintained.

While some of the objectives of the present invention are satisfied by features disclosed in the prior art, none of the inventions found include all of the requirements identified.

SUMMARY OF THE INVENTION

The present invention addresses all of the deficiencies of prior art forging stock cutting methods and machinery and satisfies all of the objectives described above.

An apparatus for cutting rings from a forging stock of a high strength alloy, may be constructed from the following components. A horizontal mounting surface and a machine base fixedly attached to the mounting surface. A rotating headstock is fixedly attached to the machine base and has a first axis of rotation parallel to the horizontal mounting surface. The headstock has a front face orthogonal to the axis of rotation of the headstock.

The headstock is capable of providing rotation at least one speed and capable of providing rotation in at least one direction. The front face of the headstock is adapted to removably attach a clamping means parallel to the front face.

A pivotally mounted saw arbor is movably mounted parallel to the first axis of rotation. The saw arbor rotates about a second axis parallel to and spaced from said first axis. A means for rotating the saw arbor at a plurality of pre-selected speeds is provided along with a means for changing the pre-selected speeds at which the saw arbor may be rotated. An abrasive cut-off wheel is removably mounted to the saw arbor. A means is provided for controlling the distance from the abrasive cut-off wheel to the front face of the headstock and thereby allowing the operator to determine the thickness of the ring to be cut from the forging stock.

A means is provided for causing the abrasive cut-off wheel to pivot toward the forging stock, thereby causing the rotating cut-off wheel to engage the rotating forging stock to cut the forging stock into rings of pre-determined thickness while producing particulate matter. A means is also provided for cooling the abrasive cut-off wheel and the forging stock and for removing and collecting particulate material produced by the cutting process from the vicinity of the abrasive cut-off wheel.

In one variation of the invention the clamping means removably attached to the front face of the headstock comprises an independently adjustable four-jaw chuck. In another variation an alternative clamping means comprising a self-centering three-jaw chuck is clamped in the four-jaw chuck.

In another variation of the invention the means for rotating the saw arbor is an electric motor capable of at least one speed. In still a further variation the means for controlling the rotational speed of the saw arbor further comprises a Hertz converter connected to the electric motor and a controlling means connected to the Hertz converter. A means is provided for determining an appropriate number of Hertz to be provided to the electric motor for a desired cutting speed under varying conditions. When the diameter of the abrasive cut-off wheel is diminished through use it is desired to increase the speed of the saw arbor, thereby maintaining a relatively constant cutting speed for an outer edge of the wheel. The number of Hertz provided to the electric motor may be increased, thereby increasing the rotational speed of the saw arbor without decreasing the power applied to the cut-off wheel.

In still a further variation of the invention the means for controlling the distance from the abrasive cut-off wheel to the front face of the headstock comprises an incrementally controllable feed device capable of displacing the cut-off wheel from the front face of the headstock. The feed device maintains the orthogonal relationship between the cut-off wheel and the rotational axis of the headstock. A digital display illustrates the displacement of the cut-off wheel from the front face of the headstock. A switching means is provided for controlling the feed device based on output from the digital display. When the operator desires to adjust the thickness of the ring to be cut from the forging stock he may vary the displacement of the cut-off wheel from the front face of the headstock using the switching means and the output from the digital display.

In another variation of the invention the means for causing the abrasive cut-off wheel to pivot toward the forging stock comprises a pivotal mounting for the saw arbor and the means for rotating said saw arbor. The pivotal mounting is movably mounted parallel to the machine bed and includes a pivoting portion and a non-pivoting portion. A hydraulic cylinder is disposed between the pivoting portion and the non-pivoting portion of the pivotal mounting. A hydraulic pump, hydraulic fluid, valving, hoses, and control means are provided to permit the hydraulic cylinder to cause the cut-off wheel to engage the forging stock with a predetermined amount of force and to maintain such engagement as the portion of the forging stock to be cut becomes smaller.

A means is provided for disengaging the hydraulic cylinder from the pivotal mounting for the saw arbor so that the cut-off wheel may be manually pivoted toward and away from the forging stock. When the operator desires to cut forging stock of irregular cross-section, the pivotal mounting for the saw arbor may be disconnected from the hydraulic cylinder. This permits the operator to manually apply pressure to cause the cut-off wheel to engage the forging stock as may be required by the shape of the forging stock.

In still another variation the means for cooling the abrasive cut-off wheel and the forging stock further comprises cooling fluid and a nozzle positioned adjacent the rotating forging stock being cut. The nozzle is adjustable so that cooling fluid may be directed to the cut-off wheel adjacent the point at which the wheel engages the forging stock. A cooling fluid pump is provided that is capable of producing at least one pressure level, as is a fluid reservoir and tubing connecting the reservoir to the pump and connecting the pump to the nozzle. A means is provided for collecting cooling fluid from the vicinity of the cut-off wheel and returning the fluid to the reservoir.

In yet another variation of the invention the means for removing and collecting particulate material produced by the cutting process from the vicinity of the abrasive cut-off wheel comprises a collection chute positioned adjacent the point at which the cut-off wheel engages the forging stock and a vacuum system. The vacuum system has an intake end and an exhaust end. A hose connects the chute to the intake end of the vacuum system and a separator unit is connected to the exhaust end of the vacuum system. The separator unit is capable of removing particulate matter from the air handled by the vacuum system and depositing the particulate matter in a container. An exhaust system ducts the air from the separator unit to a location remote from apparatus for cutting rings from forging stocks.

The invention includes a method for cutting rings from forging stocks of substantially regular cross-section. The method comprises selecting a forging stock having a substantially regular cross-section and clamping the forging stock in the three-jaw chuck mounted in the four-jaw chuck. The clamping of the forging stock is then adjusted using an indicating device to minimize rotational wobble of the forging stock. Next the displacement of the cut-off wheel from the front face of the headstock is set using the digital display and switching means to determine the point at which to cut the forging stock.

The operator then determines the appropriate number of Hertz to be input to the means for rotating the saw arbor based on the cut-off wheel diameter and desired cutting speed. The determined number of Hertz is next to the means for rotating the saw arbor and the means for cooling the abrasive cut-off wheel and fluid recovery system is activated. Next, the means for removing and collecting particulate material produced by the cutting process from the vicinity of the abrasive cut-off wheel is activated and the means for causing the abrasive cut-off wheel to pivot toward the forging stock is engaged. The operator then monitors the cutting of the ring from the forging stock.

The invention also includes a method for cutting rings from forging stocks of irregular cross-section. The method comprises selecting a forging stock having an irregular cross-section and clamping the forging stock in the rotating headstock using the four-jaw chuck mounted to the front face of the headstock. The clamping of the forging stock is then adjusted using an indicating device to minimize rotational wobble of the forging stock. The operator then sets the displacement of the cut-off wheel from the front face of the headstock using digital display and switching means to determine the point at which to cut the forging stock.

Next the operator determines the appropriate number of Hertz to be input to the means for rotating the saw arbor based on the cut-off wheel diameter and desired cutting speed. The appropriate number of Hertz to be input to the means for rotating the saw arbor is then provided. The operator next activates the means for cooling the abrasive cut-off wheel and fluid recovery system. Next, the means for removing and collecting particulate material produced by the cutting process from the vicinity of the abrasive cut-off wheel is activated. The operator then causes the abrasive cut-off wheel to pivot toward the forging stock by manually pulling a handle removably attached to the pivoting portion of the pivotal mounting. The operator pulls the handle toward the rotating forging stock so as to maintain an even cutting pressure on the forging stock while monitoring the cutting of the ring from the forging stock.

DETAILED DESCRIPTION OF THE PREFERRED EMBODIMENT

FIGS. 1–5 illustrate an apparatus 10 for cutting rings (not shown) from a forging stock 18 of a high strength alloy comprising the following components. A horizontal mounting surface 22 and a machine base 26 fixedly attached to the mounting surface 22. A rotating headstock 42 is fixedly attached to the machine base 26 and has a first axis of rotation 46 parallel to the horizontal mounting surface 22. The headstock 42 has a front face 50 orthogonal to the axis of rotation 46 of the headstock 42.

The headstock 42 is capable of providing rotation at least one speed and capable of providing rotation in at least one direction. The front face 50 of the headstock 42 is adapted to removably attach a clamping means 62 parallel to the front face 50.

A pivotally mounted saw arbor f is movably mounted parallel to the first axis of rotation 46. The saw arbor 70 rotates about a second axis 48 parallel to and spaced from the first axis 46. A means 74 for rotating the saw arbor 70 at a plurality of pre-selected speeds is provided along with a means 78 for changing the pre-selected speeds at which the saw arbor 70 may be rotated. An abrasive cut-off wheel 82 is removably mounted to the saw arbor 70. A means 86 is provided for controlling the distance from the abrasive cut-off wheel to the front face 50 of the headstock 42, thereby allowing the operator to determine the thickness of the ring to be cut from the forging stock 18.

Figure 1:
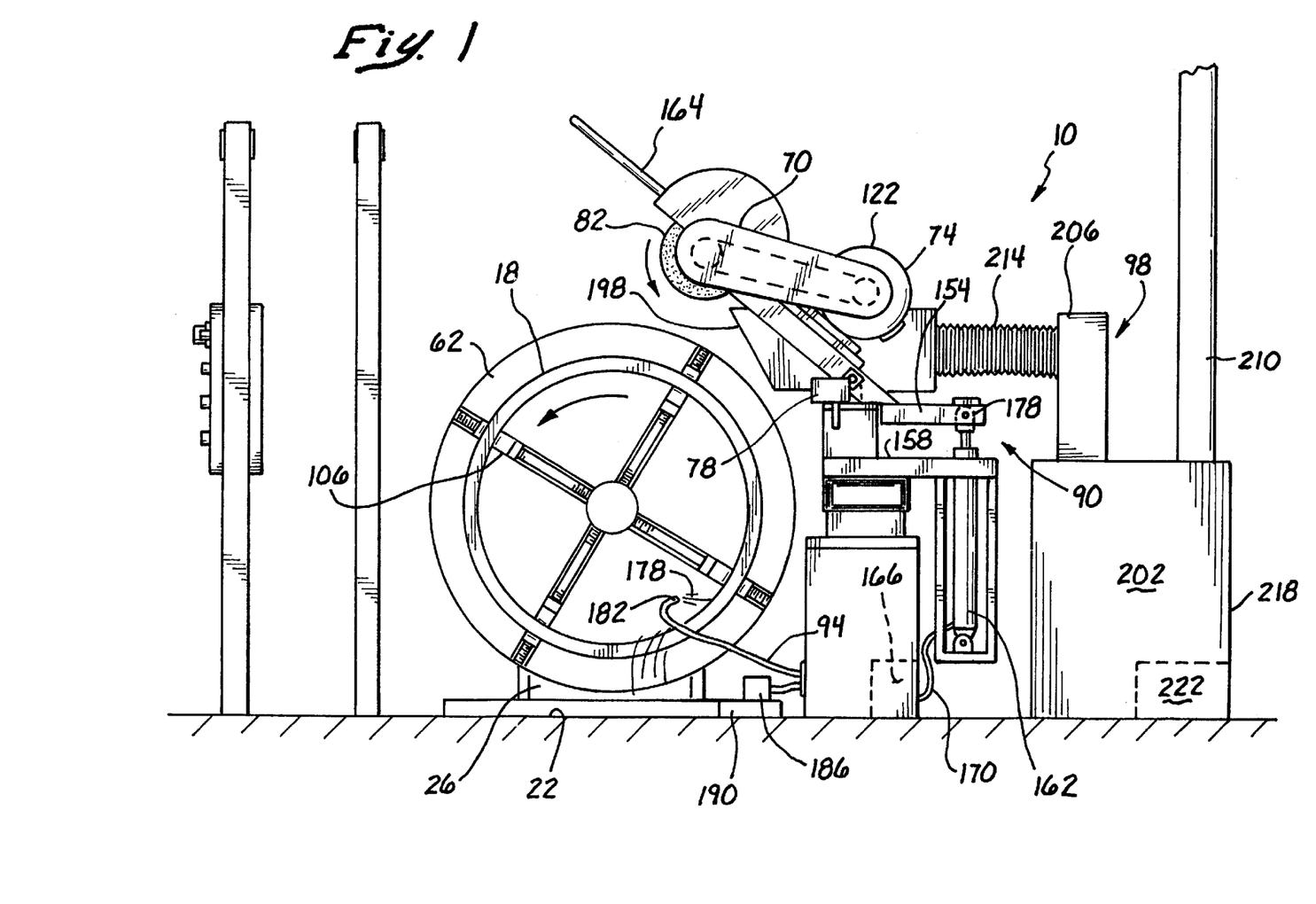
FIG. 1 is an end elevation of the preferred embodiment of the invention illustrating the abrasive cut-off wheel, pivoting saw arbor and rotating headstock.
Figure 2:
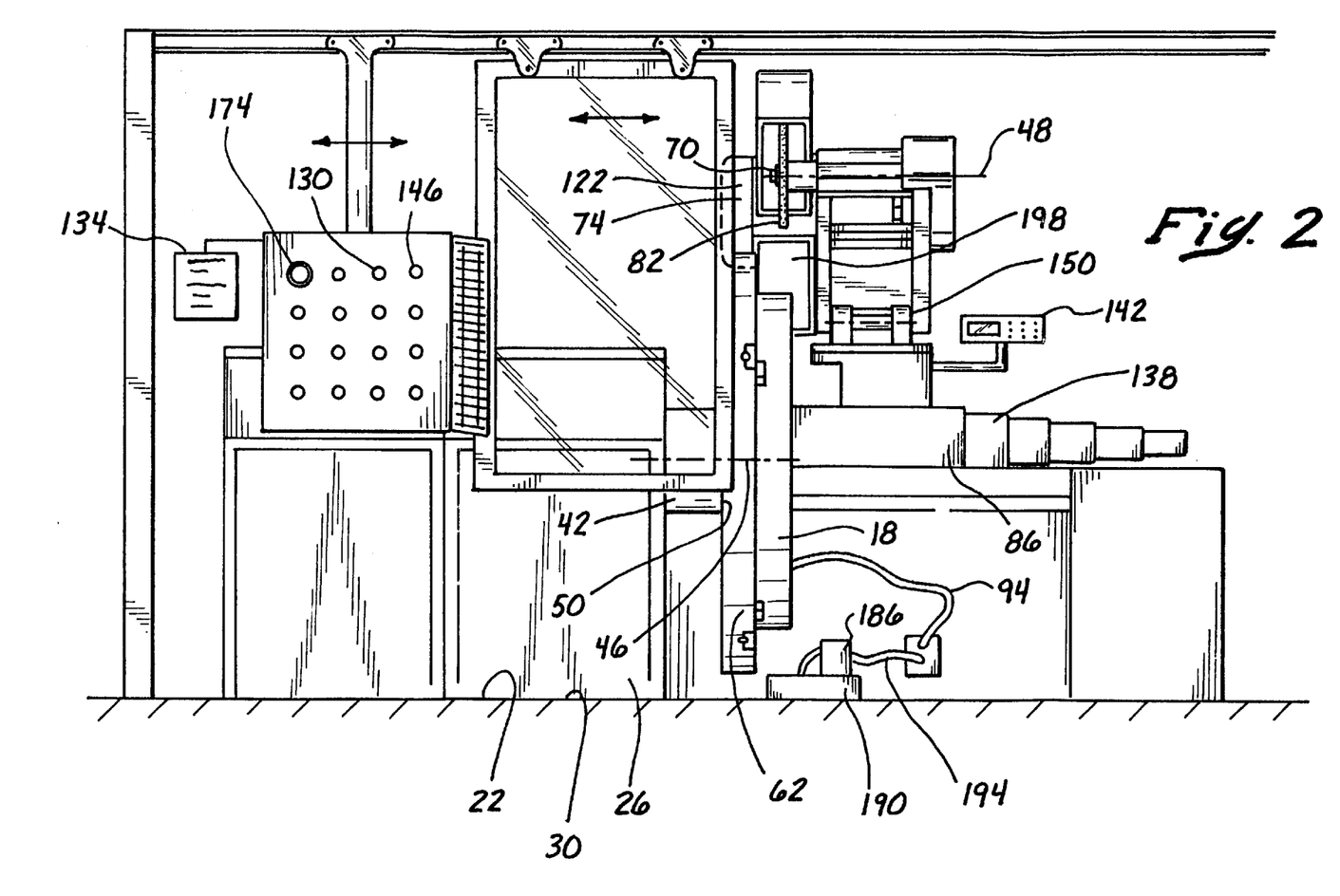
FIG. 2 is a front elevation of the FIG. 1 embodiment.
Figure 4:
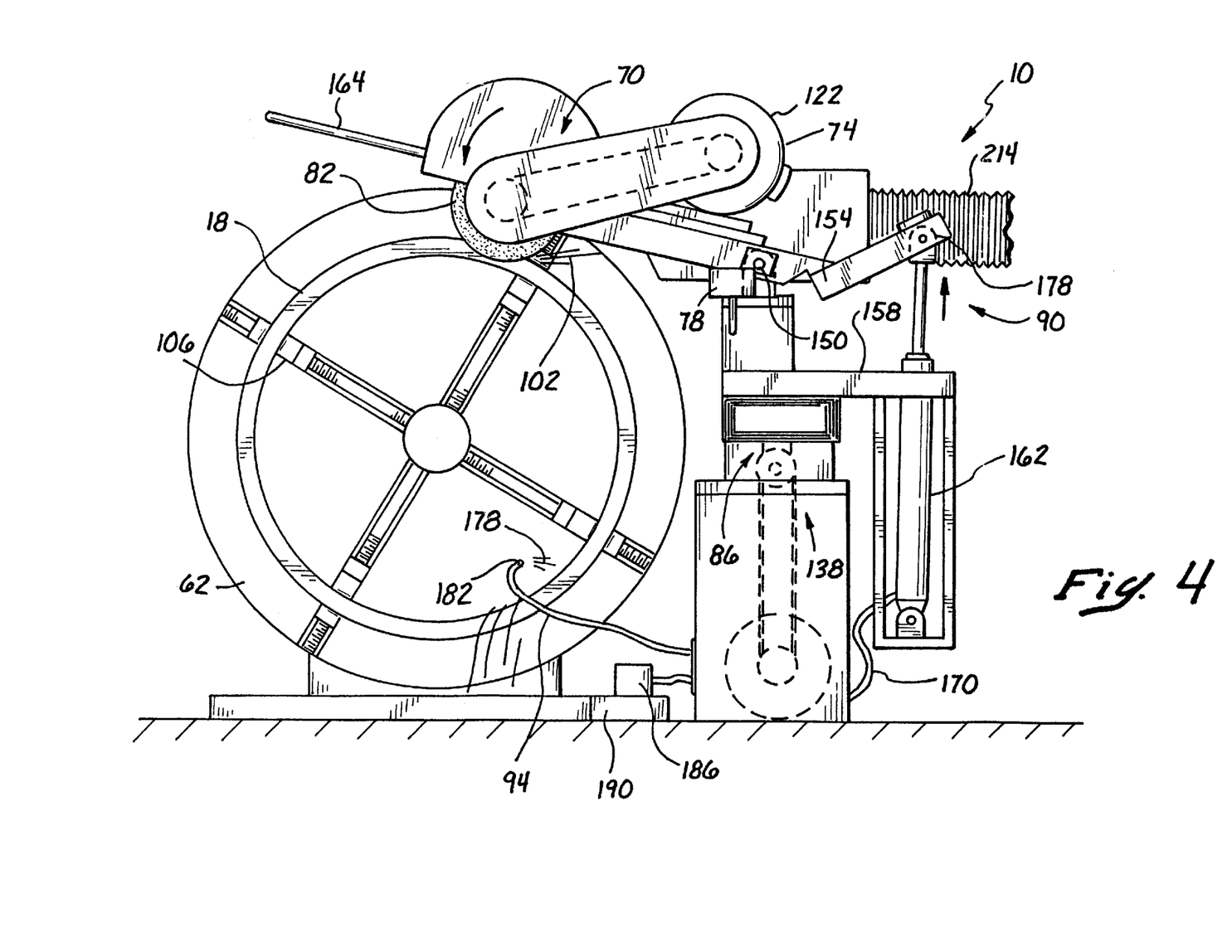
FIG. 4 is an enlarged partial end elevation of the FIG. 1 embodiment illustrating the cut-off wheel engaging the forging.

As shown in FIG. 4, a means 90 is provided for causing the abrasive cut-off wheel 82 to pivot toward the forging stock 18, thereby causing the rotating cut-off wheel 82 to engage the rotating forging stock 18 to cut the forging stock 18 into rings 14 of pre-determined thickness while producing particulate matter 102. As shown in FIGS. 1, 2 and 4, a means 94 is also provided for cooling the abrasive cut-off wheel 82 and the forging stock 18 and, as shown in FIG. 1, a means 98 is provided for removing and collecting particulate matter 102 produced by the cutting process from the vicinity of the abrasive cut-off wheel 82.

In one variation of the invention, as shown in FIGS. 1 and 4, the clamping means 62 removably attached to the front face 50 of the headstock 42 comprises an independently adjustable four-jaw chuck 106. In another variation, illustrated in FIG. 5, alternative clamping means 62 comprising a self-centering three-jaw chuck is clamped in the four-jaw chuck 106.

In another variation of the invention as shown in FIGS. 1–4, the means 74 for rotating the saw arbor 70 is an electric motor 122 capable of at least one speed. In still a further variation the means 78 for controlling the rotational speed of the saw arbor 70 further comprises a Hertz converter (not shown) connected to the electric motor 122 and a controlling means 130 (FIG. 2) connected to the Hertz converter. A means 134 is provided for determining an appropriate number of Hertz to be provided to the electric motor 122 for a desired cutting speed under varying conditions. When the diameter of the abrasive cut-off wheel 82 is diminished through use it is desired to increase the speed of the saw arbor 70, thereby maintaining a relatively constant cutting speed for an outer edge of the wheel 82. The number of Hertz provided to the electric motor 122 may be increased, thereby increasing the rotational speed of the saw arbor 70 without decreasing the power applied to the cut-off wheel 82.

In still a further variation of the invention, as illustrated in FIG. 2, the means 86 for controlling the distance from the abrasive cut-off wheel 82 to the front face 50 of the headstock 42 comprises an incrementally controllable feed device 138 capable of displacing the cut-off wheel 82 from the front face 50 of the headstock 42. The feed device 138 maintains the orthogonal relationship between the cut-off wheel 82 and the rotational axis 46 of the headstock 42. As shown in FIG. 2, a digital display 142 illustrates the displacement of the cut-off wheel 82 from the front face 50 of the headstock 42. A switching means 146 is provided for controlling the feed device 138 based on output from the digital display 142. When the operator desires to adjust the thickness of the ring to be cut from the forging stock 18 he may vary the displacement of the cut-off wheel 82 from the front face 50 of the headstock 42 using the switching means 146 and the output from the digital display 142.

In another variation of the invention, as shown in FIG. 1, the means 90 for causing the abrasive cut-off wheel 82 to pivot toward the forging stock 18 comprises a pivotal mounting 150 for the saw arbor 70 and the means 74 for rotating the saw arbor 70. The pivotal mounting 150 is movably mounted parallel to the machine bed 26 and includes a pivoting portion 154 and a non-pivoting portion 158. A hydraulic cylinder 162 is disposed between the pivoting portion 154 and the non-pivoting portion 158 of the pivotal mounting 150. A hydraulic pump 166, hydraulic fluid, valving, hoses 170, and control means 174 (FIG. 2) are provided to permit the hydraulic cylinder 162 to cause the cut-off wheel 82 to engage the forging stock 18 with a predetermined amount of force and to maintain such engagement as the portion of the forging stock 18 to be cut becomes smaller.

A means 178 (FIGS. 1 and 4) is provided for disengaging the hydraulic cylinder 162 from the pivotal mounting 150 for the saw arbor 70 so that the cut-off wheel 82 may be manually pivoted toward and away from the forging stock 18. When the operator desires to cut forging stock 18 of irregular cross-section, the pivotal mounting 150 for the saw arbor 70 may be disconnected from the hydraulic cylinder 162. This permits the operator to manually apply pressure by means of a handle 164 to cause the cut-off wheel 82 to engage the forging stock 18 as may be required by the shape of the forging stock 18.

Figure 3:
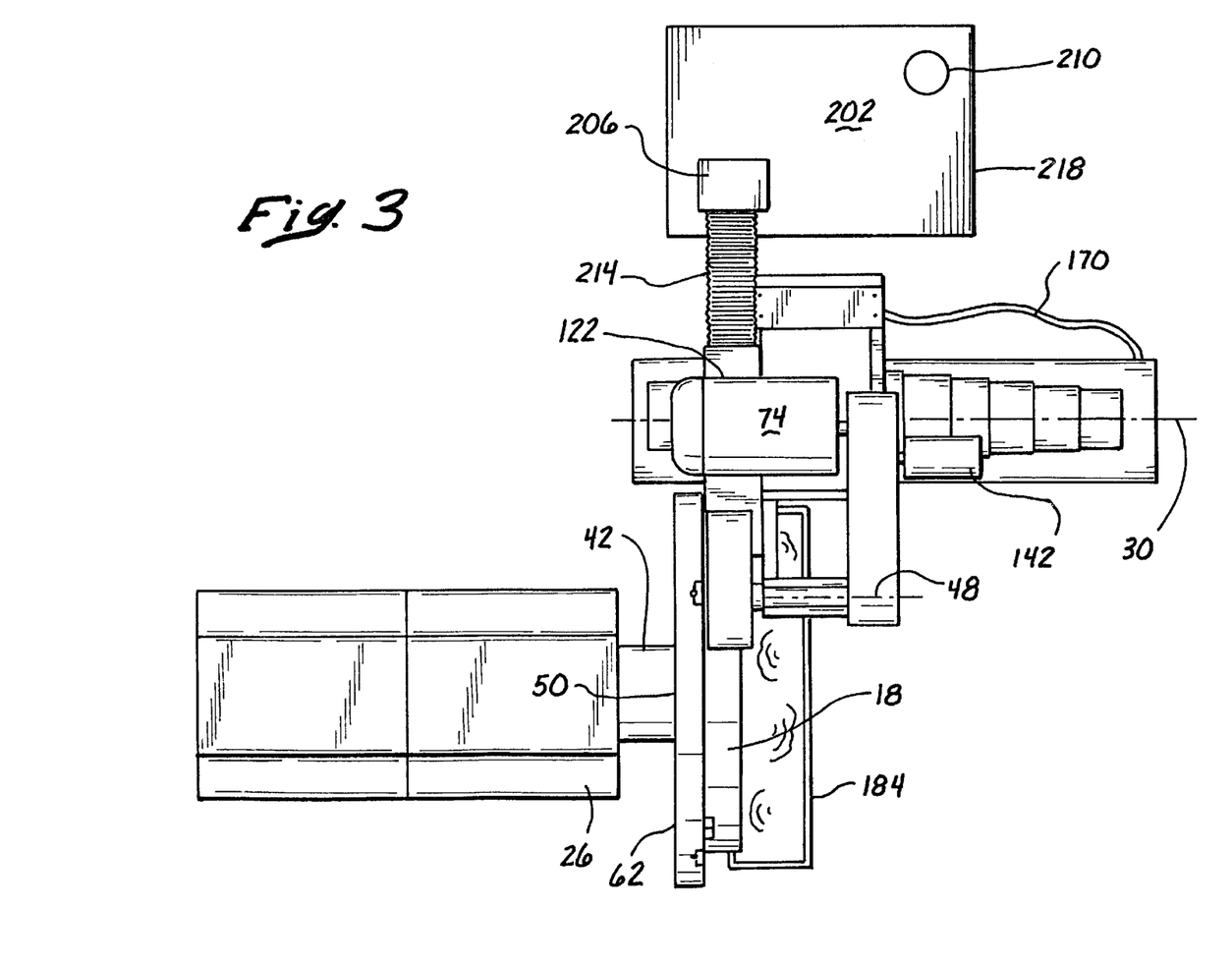
FIG. 3 is a plan view of the FIG. 1 embodiment.

In still another variation, as shown in FIGS. 1–4, the means 94 for cooling the abrasive cut-off wheel 82 and the forging stock 18 further comprises cooling fluid 178 and a nozzle 182 positioned adjacent the rotating forging stock 18 being cut. The nozzle 182 is adjustable so that cooling fluid 178 may be directed to the portion of the forging stock 18 being cut. A cooling fluid pump 186 is provided that is capable of producing at least one pressure level, as is a fluid reservoir 190 and tubing 194 connecting the reservoir 190 to the pump 186 and connecting the pump 186 to the nozzle 182. As shown in FIG. 3, a means 184 is provided for collecting cooling fluid 178 from the vicinity of the cut-off wheel 82 and returning the fluid 178 to the reservoir 190.

In yet another variation of the invention, as shown in FIGS. 1 and 3, the means 98 for removing and collecting particulate material 102 produced by the cutting process from the vicinity of the abrasive cut-off wheel 82 comprises a collection chute 198 positioned adjacent the point at which the cut-off wheel 82 engages the forging stock 18 and a vacuum system 202. The vacuum system 202 has an intake end 206 and an exhaust end 210. A hose 214 connects the chute 198 to the intake end 206 of the vacuum system 202. A separator unit 218 is connected to the exhaust end 210 of the vacuum system 202. The separator unit 218 is capable of removing particulate matter 102 from the air handled by the vacuum system 202 and depositing the particulate matter 102 in a container 222. An exhaust system (not shown) ducts the air from the separator unit 218 to a location remote from apparatus 10 for cutting rings from forging stocks 18.

Figure 5:
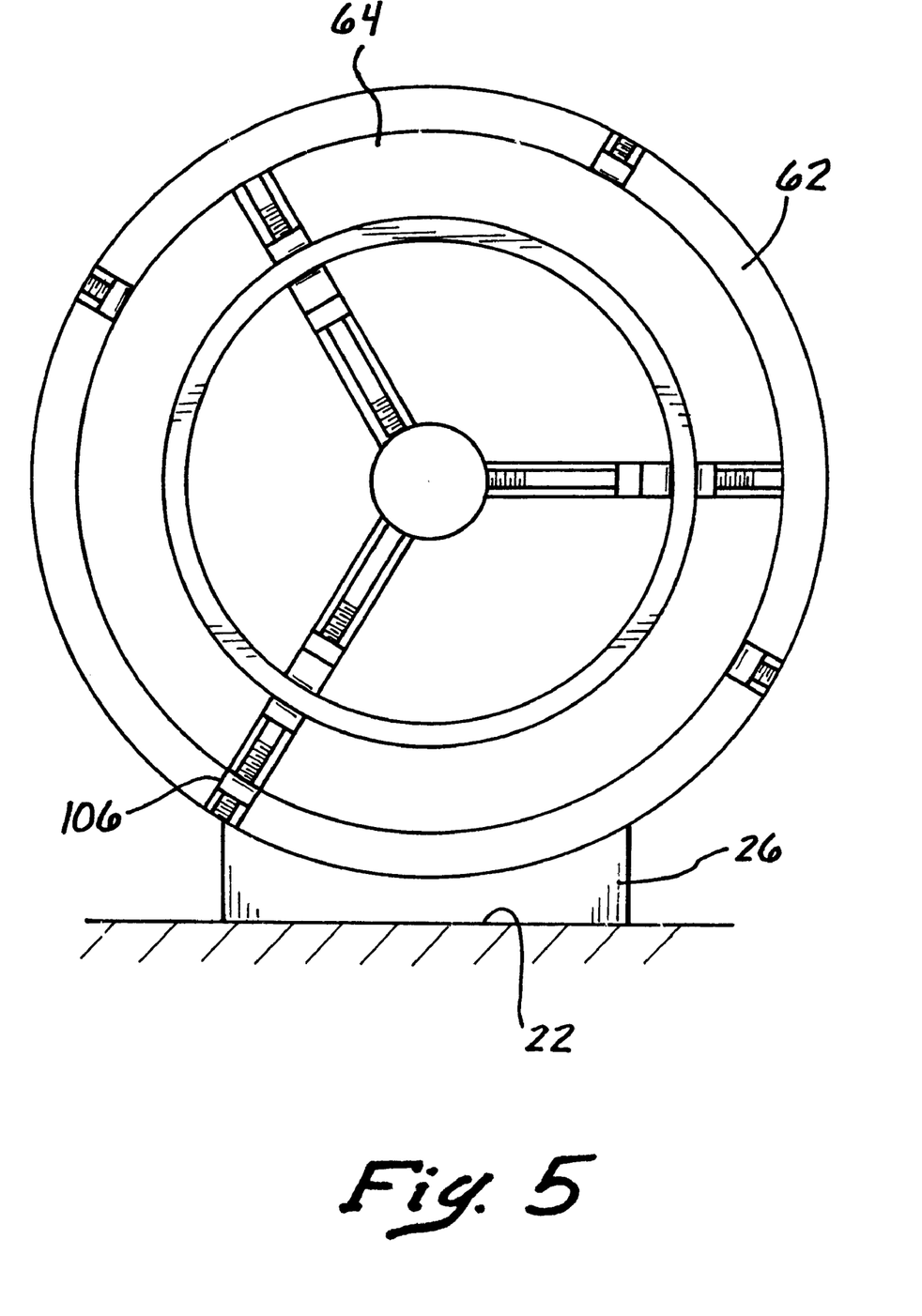
FIG. 5 is an enlarged partial end elevation of the FIG. 1 embodiment illustrating a three-jaw chuck held in the four-jaw chuck.

The invention includes a method for cutting rings from forging stocks 18 of substantially regular cross-section. The method comprises selecting forging stock 18 having a substantially regular cross-section and clamping the forging stock 18 in the three-jaw chuck 64 mounted to the four-jaw chuck 106. The clamping of the forging stock 18 is then adjusted using an indicating device (not shown) to minimize rotational wobble of the forging stock 18. Next the displacement of the cut-off wheel 82 from the front face 50 of the headstock 42 is set using the digital display 142 and switching means 146 to determine the point at which to cut the forging stock 18.

The operator then determines the appropriate number of Hertz to be input to the means 74 for rotating the saw arbor 70 based on the cut-off wheel 82 diameter and desired cutting speed. The determined number of Hertz is next input to the means 74 for rotating the saw arbor 70 and the means 94 for cooling the abrasive cut-off wheel 82 and fluid recovery system is activated. Next, the means 98 for removing and collecting particulate material 102 produced by the cutting process from the vicinity of the abrasive cut-off wheel 82 is activated and the means 90 for causing the abrasive cut-off wheel 82 to pivot toward the forging stock 18 is engaged. The operator then monitors the cutting of the ring from the forging stock 18.

The invention also includes a method for cutting rings from forging stock 18 of irregular cross-section. The method comprises selecting a forging stock 18 having an irregular cross-section and clamping the forging stock 18 in the four-jaw chuck 106 mounted to the front face 50 of the headstock 42. The clamping of the forging stock 18 is then adjusted using an indicating device (not shown) to minimize rotational wobble of the forging stock 18. The operator then sets the displacement of the cut-off wheel 82 from the front face 50 of the headstock 42 using the digital display 142 and switching means 146 to determine the point at which to cut the forging stock 18.

Next the operator determines the appropriate number of Hertz to be input to the means 74 for rotating the saw arbor 70 based on the cut-off wheel 82 diameter and desired cutting speed. The appropriate number of Hertz to be input to the means 70 for rotating the saw arbor 74 is then provided. The operator next activates the means 94 for cooling the abrasive cut-off wheel 82 and fluid recovery system. Next, the means 98 for removing and collecting particulate material 102 produced by the cutting process from the vicinity of the abrasive cutoff wheel 82 is activated. The operator then causes the abrasive cut-off wheel 82 to pivot toward the forging stock 18 by manually pulling the handle 164 removably attached to the pivoting portion 154 of the pivotal mounting 150. The operator pulls the handle 164 toward the rotating forging stock 18 so as to maintain an even cutting pressure on the forging stock 18 while monitoring the cutting of the ring from the forging stock 18.

I claim:

1. An apparatus for cutting rings from forging stock of a high strength alloy, said apparatus comprising:

means for removably holding and rotating said forging stock about a first axis, said axis extending through the elongated extent of the forging;

means for pivotally mounting a saw arbor disposed to rotate about a second axis parallel to and spaced from said first axis;

an abrasive cut-off wheel removably mounted to the saw arbor;

means for rotating the saw arbor at a plurality of pre-selected speeds;

means for changing the pre-selected speeds at which the saw arbor may be rotated;

means for controlling the displacement of the abrasive cut-off wheel from the means for holding the forging stock along the first axis of the forging stock, thereby allowing the operator to determine the length of the ring to be cut from the forging stock;

means for causing the abrasive cut-off wheel to pivot toward the forging stock, thereby causing the rotating cut-off wheel to engage the rotating forging stock to cut the forging stock into pre-determined rings while producing particulate matter; and means for cooling the abrasive cut-off wheel and the forging stock.

2. An apparatus for cutting rings from forging stock of a high strength alloy, said apparatus comprising:

a horizontal mounting surface;

a machine base fixedly attached to the mounting surface;

a rotating headstock fixedly attached to the machine base and having a first axis of rotation parallel to the horizontal mounting surface;

said headstock having a front face, said front face being orthogonal to the axis of rotation of the headstock;

said headstock capable of providing rotation at least one speed and capable of providing rotation in at least one direction;

said front face adapted to removably attach a clamping means parallel to the front face;

a pivotally mounted saw arbor movably mounted parallel to the first axis of rotation, said saw arbor disposed to rotate about a second axis parallel to and spaced from said first axis;

a means for rotating said saw arbor at a plurality of pre-selected speeds;

means for changing the pre-selected speeds at which the saw arbor may be rotated;

an abrasive cut-off wheel removably mounted to said saw arbor;

means for controlling the distance from the abrasive cut-off wheel to the front face of the headstock thereby allowing the operator to determine the thickness of the ring to be cut from the forging stock;

means for causing the abrasive cut-off wheel to pivot toward the headstock, thereby causing the rotating cut-off wheel to engage the rotating forging stock to cut the forging stock into rings of pre-determined thickness while producing particulate matter;

means for cooling the abrasive cut-off wheel and the forging stock; and means for removing and collecting particulate material produced by the cutting process from the vicinity of the abrasive cut-off wheel.

3. An apparatus for rings from forging stock as described in claim 2, wherein the clamping means removably attached to the front face of the headstock comprises an independently adjustable four-jaw chuck.

4. An apparatus for rings from forging stock as described in claim 2, wherein the clamping means removably attached to the front face of the headstock comprises an adjustable three-jaw chuck mounted in the four-jaw chuck.

5. An apparatus for rings from forging stock as described in claim 2, wherein the means for rotating the saw arbor is an electric motor capable of at least one speed.

6. An apparatus for rings from forging stock as described in claim 5, wherein the means for controlling the rotational speed of the saw arbor further comprises:

a Hertz converter connected to the electric motor;

a controlling means connected to the Hertz converter;

a means for determining an appropriate number of Hertz to be provided to the electric motor for a desired cutting speed under varying conditions; and whereby, when the diameter of the abrasive cut-off wheel is diminished through use and it is desired to increase the speed of the saw arbor, thereby maintaining a relatively constant cutting speed for an outer edge of the wheel, the number of Hertz provided to the electric motor may be increased, thereby increasing the rotational speed of the saw arbor without decreasing the power applied to the cut-off wheel.

7. An apparatus for rings from forging stock as described in claim 2, wherein the means for controlling the distance from the abrasive cut-off wheel to the front face of the headstock comprises:

an incrementally controllable feed device capable of displacing the cut-off wheel from the front face of the headstock while maintaining the orthogonal relationship between the cut-off wheel and the rotational axis of the headstock;

a digital display illustrating the displacement of the cut-off wheel from the front face of the headstock;

a switching means for controlling the feed device based on output from the digital display; and whereby, when the operator desires to adjust the thickness of the ring to be cut from the forging stock he may vary the displacement of the cut-off wheel from the front face of the headstock using the switching means and the output from the digital display.

8. An apparatus for rings from forging stock as described in claim 2, wherein the means for causing the abrasive cut-off wheel to pivot toward the headstock comprises:

a pivotal mounting for the saw arbor and the means for rotating said saw arbor;

said pivotal mounting being movably mounted parallel to the machine bed and including a pivoting portion and a non-pivoting portion;

a hydraulic cylinder disposed between the pivoting portion and the non-pivoting portion of the pivotal mounting;

a hydraulic pump, hydraulic fluid, valving, hoses, and control means to permit the hydraulic cylinder to cause the cut-off wheel to engage the forging stock with a predetermined amount of force and to maintain such engagement as the portion of the forging stock to be cut becomes smaller;

means for disengaging the hydraulic cylinder from the pivotal mounting for the saw arbor so that the cut-off wheel may be manually pivoted toward and away from the headstock; and whereby, when the operator desires to cut forging stock of irregular cross-section, the pivotal mounting for the saw arbor may be disconnected from the hydraulic cylinder, thereby permitting the operator to manually apply pressure to cause the cut-off wheel to engage the forging stock as may be required by the shape of the forging stock.

9. An apparatus for rings from forging stock as described in claim 2, wherein the means for cooling the abrasive cut-off wheel and the forging stock further comprises:

cooling fluid;

a nozzle positioned adjacent the rotating forging stock;

said nozzle being adjustable so that cooling fluid may be directed to the portion of the forging stock being cut;

a cooling fluid pump providing at least one pressure level, a fluid reservoir and tubing connecting the reservoir to the pump and connecting the pump to the nozzle;

means for collecting cooling fluid from the vicinity of the cut-off wheel and returning the fluid to the reservoir.

10. An apparatus for rings from forging stock as described in claim 2, wherein the means for removing and collecting particulate material produced by the cutting process from the vicinity of the abrasive cut-off wheel comprises:

a collection chute positioned adjacent the point at which the cut-off wheel engages the forging stock;

a vacuum system having an intake end and an exhaust end;

a hose connecting the chute to the intake end of the vacuum system;

a separator unit connected to the exhaust end of the vacuum system;

said separator unit being capable of removing particulate matter from the air handled by the vacuum system and depositing the particulate matter in a container;

a conveyor section disposed beneath the vacuum system and separator unit, said conveyor section enabling the vacuum system and separator unit to move slidably with the pivotal mounting for the saw arbor; and an exhaust system ducting the air from the separator unit to a location remote from apparatus for cutting rings from forging stock.

11. A method for cutting rings from forging stock of substantially regular cross-section, comprising:

selecting forging stock having a substantially regular cross-section;

clamping the forging stock in the rotating headstock using the three-jaw chuck mounted in the four-jaw chuck;

adjusting the clamping of the forging stock using an indicating device to minimize rotational wobble of the forging stock;

setting the displacement of the cut-off wheel from front face of the headstock using digital display and switching means to determine the point at which to cut the forging stock;

determining the appropriate number of Hertz to be input to the means for rotating the saw arbor based on the cut-off wheel diameter and desired cutting speed;

providing the appropriate number of Hertz to be input to the means for rotating the saw arbor;

activating the means for cooling the abrasive cut-off wheel and fluid recovery system;

activating the means for removing and collecting particulate material produced by the cutting process from the vicinity of the abrasive cut-off wheel;

activating the means for causing the abrasive cut-off wheel to pivot toward the headstock; and monitoring the cutting of the ring from the forging stock.

12. A method for cutting rings from forging stock of irregular cross-section, comprising selecting a forging stock having an irregular cross-section;

clamping the forging stock in the rotating headstock using the four-jaw chuck mounted to the front face of the headstock;

adjusting the clamping of the forging stock using an indicating device to minimize rotational wobble of the forging stock;

setting the displacement of the cut-off wheel from front face of the headstock using digital display and switching means to determine the point at which to cut the forging stock;

determining the appropriate number of Hertz to be input to the means for rotating the saw arbor based on the cut-off wheel diameter and desired cutting speed;

providing the appropriate number of Hertz to be input to the means for rotating the saw arbor;

activating the means for cooling the abrasive cut-off wheel and fluid recovery system;

activating the means for removing and collecting particulate material produced by the cutting process from the vicinity of the abrasive cut-off wheel;

causing the abrasive cut-off wheel to pivot toward the headstock by manually pulling a handle removably attached to the pivoting portion of the pivotal mounting toward the rotating forging stock so as to maintain an even cutting pressure on the forging stock; and monitoring the cutting of the ring from the forging stock.

* * * * *